(12) United States Patent
Rahaman

(10) Patent No.: US 9,887,886 B2
(45) Date of Patent: Feb. 6, 2018

(54) FORENSIC SOFTWARE INVESTIGATION

(71) Applicant: Mohammad Ashiqur Rahaman, Juan les Pins (FR)

(72) Inventor: Mohammad Ashiqur Rahaman, Juan les Pins (FR)

(73) Assignee: SAP SE, Walldorf (DE)

( * ) Notice: Subject to any disclaimer, the term of this patent is extended or adjusted under 35 U.S.C. 154(b) by 645 days.

(21) Appl. No.: 14/331,865

(22) Filed: Jul. 15, 2014

(65) Prior Publication Data

US 2016/0020959 A1    Jan. 21, 2016

(51) Int. Cl.
*G06F 17/30* (2006.01)
*H04L 29/06* (2006.01)
*H04L 12/24* (2006.01)

(52) U.S. Cl.
CPC .... *H04L 41/5006* (2013.01); *G06F 17/30864* (2013.01); *H04L 41/5032* (2013.01); *H04L 63/308* (2013.01)

(58) Field of Classification Search
CPC ...................... H04L 29/00; H04L 41/00; H04L 41/50–41/5006; H04L 11/3438; H04L 43/00; H04L 43/04–43/08; H04L 43/0876; H04L 43/12–43/50; H04L 51/00; H04L 51/04; H04L 51/046; H04L 63/00; H04L 63/10; H04L 63/14–63/1441; H04L 63/20–63/308; G06F 11/00; G06F 11/07; G06F 11/30–11/3041; G06F 11/30581; G06F 11/3089; G06F 11/3096–11/321; G06F 11/34; G06F 41/5032; G06F 15/00; G06F 15/16; G06F 17/00; G06F 17/30; G06F 17/30864
See application file for complete search history.

(56) References Cited

U.S. PATENT DOCUMENTS 7,082,463 B1 *   7/2006  Bradley .............. H04L 41/5003
                                                 709/223
7,464,163 B1 *  12/2008  Bantz .................... G06Q 10/06
                                                 370/259

(Continued)

OTHER PUBLICATIONS

Cruz—The Basics of Cloud Forensics—Nov. 5, 2012.*

(Continued)

*Primary Examiner* — Tauqir Hussain
*Assistant Examiner* — Boris Grijalva Lobos
(74) *Attorney, Agent, or Firm* — Brake Hughes Bellermann LLP

(57) ABSTRACT

In accordance with aspects of the disclosure, systems and methods are provided for managing forensic investigations of client assets associated with a client based on a forensic service agreement between the client and a cloud service provider, including establishing the forensic service agreement between the client and the cloud service provider for servicing the forensic investigations of the client assets associated with the client, acquiring forensic data related to each client asset associated with the client, and generating one or more client inventory records for each client asset based on the forensic data related to each client asset, and generating one or more client evidence records for each client asset based on each client inventory record generated for each client asset.

20 Claims, 5 Drawing Sheets

(56) References Cited

U.S. PATENT DOCUMENTS

| | | | | |
|---|---|---|---|---|
| 7,805,764 | B1* | 9/2010 | Carson | G11B 20/00086 |
| | | | | 713/176 |
| 8,572,376 | B2* | 10/2013 | Andersen | G06Q 30/02 |
| | | | | 707/741 |
| 8,914,469 | B2* | 12/2014 | Dawson | G06Q 50/188 |
| | | | | 705/80 |
| 9,450,836 | B2* | 9/2016 | Hammer | H04L 41/50 |
| 2002/0072333 | A1* | 6/2002 | Gnesda | H04M 15/00 |
| | | | | 455/67.11 |
| 2004/0260947 | A1* | 12/2004 | Brady | H04L 63/1425 |
| | | | | 726/23 |
| 2008/0155084 | A1* | 6/2008 | Yu | H04L 67/125 |
| | | | | 709/223 |
| 2008/0244034 | A1* | 10/2008 | Shannon | H04L 67/08 |
| | | | | 709/217 |
| 2009/0288164 | A1* | 11/2009 | Adelstein | H04L 63/123 |
| | | | | 726/22 |
| 2010/0319004 | A1* | 12/2010 | Hudson | G06F 9/5072 |
| | | | | 719/313 |
| 2011/0153748 | A1* | 6/2011 | Lee | H04L 67/125 |
| | | | | 709/205 |
| 2012/0144407 | A1* | 6/2012 | Hacigumus | G06F 9/544 |
| | | | | 719/328 |
| 2013/0097706 | A1* | 4/2013 | Titonis | G06F 21/56 |
| | | | | 726/24 |
| 2013/0166711 | A1* | 6/2013 | Wang | H04N 7/181 |
| | | | | 709/223 |
| 2013/0218940 | A1* | 8/2013 | Shannon | H04L 65/40 |
| | | | | 709/201 |
| 2013/0298230 | A1* | 11/2013 | Kumar | G06F 21/52 |
| | | | | 726/22 |
| 2013/0305375 | A1* | 11/2013 | Attanasio | H04L 63/1425 |
| | | | | 726/24 |
| 2014/0052644 | A1* | 2/2014 | Ott | G06Q 10/10 |
| | | | | 705/304 |
| 2014/0183269 | A1* | 7/2014 | Glaser | G06F 21/32 |
| | | | | 235/492 |
| 2014/0281741 | A1* | 9/2014 | Bohacek | G06F 11/3409 |
| | | | | 714/47.3 |
| 2014/0317681 | A1* | 10/2014 | Shende | H04L 63/10 |
| | | | | 726/1 |
| 2015/0067171 | A1* | 3/2015 | Yum | H04L 67/2809 |
| | | | | 709/226 |
| 2015/0381641 | A1* | 12/2015 | Cabrera | H04L 63/1425 |
| | | | | 726/23 |
| 2016/0357762 | A1* | 12/2016 | Aghdasi | G06F 17/3082 |

OTHER PUBLICATIONS

David Kovar—forensicfocus.com—Agreement for Computer Forensic Services—Dec. 31, 2007.*
NIST—NIST Cloud Computing Forensic Science Challenges—Jun. 2014.*
Darren Quick—Forensic Analysis of Cloud Storage Client Data—Oct. 28, 2012.*
Ruan et al. Key Terms for SLA to Support Cloud Forensics—Dec. 7, 2012.*
Shende—Cloud Forensics as a Service (FraaS)—May 5, 2012.*
Ball—Engagement Agreement—2007.*
Bit9—Real-time Cyber Forensic for Incident Response—Nov. 2013.*
Unknown—Agreement for Computer Forensic Services—Dec. 2007.*

\* cited by examiner

FORENSIC SOFTWARE INVESTIGATION

TECHNICAL FIELD

The present description relates to various computer-based techniques for forensic software investigation in a cloud environment.

BACKGROUND

In some cloud systems, standard security mechanisms may be deficient when protecting customer data and cloud infrastructure. Generally, conventional cloud systems continue to be typically vulnerable to malicious attacks and threats that tend to exploit vulnerabilities in a cloud leading to privacy, integrity, or confidentiality breaches of customer data, information, and applications. As such, there exists a need to overcome cloud security risks and threats to cloud computing resources.

Further, due to some remote deployment models and shared resources, performing investigations on security threats in a cloud is challenging. Existing cloud based software security solutions typically focus on user authorization and to some extent on privacy of the solutions. Thus, conventional security solutions are typically deficient, and as such, there exists a need for providing improved security solutions in a cloud to overcome cloud security risks and threats to cloud computing resources.

SUMMARY

In accordance with aspects of the disclosure, a computer system may be provided for forensic software investigation including instructions stored on a computer-readable medium and executable by at least one processor. The computer system may include a forensic cloud server configured to cause the at least one processor to manage forensic investigations of client assets associated with a client based on a forensic service agreement between the client and a cloud service provider in a cloud environment. The forensic cloud server may include a forensic service interface configured to establish the forensic service agreement between the client and the cloud service provider for servicing the forensic investigations of the client assets associated with the client. In case of multiple cloud service providers (CSPs) involved, the interface may be configured to capture agreement(s) between the client and each CSP and also agreement(s) between multiple CSPs. The forensic cloud server may include a forensic data handler configured to acquire forensic data related to each client asset associated with the client, and generate one or more client inventory records for each client asset based on the forensic data related to each client asset. The forensic cloud server may include a forensic engine configured to generate one or more client evidence records for each client asset based on each client inventory record generated for each client asset. The forensic cloud server may include a forensic record handler configured to persist the one or more client inventory records and the one or more client evidence records in a data store.

In accordance with aspects of the disclosure, a computer program product may be provided, wherein the computer program product is tangibly embodied on a non-transitory computer-readable storage medium and includes instructions that, when executed by at least one processor, may be configured to manage forensic investigations of client assets associated with a client based on a forensic service agreement between the client and a cloud service provider in a cloud environment. The instructions may be configured to establish the forensic service agreement between the client and the cloud service provider for servicing the forensic investigations of the client assets associated with the client. The instructions may be configured to acquire forensic data related to each client asset associated with the client, and generate one or more client inventory records for each client asset based on the forensic data related to each client asset. The instructions may be configured to generate one or more client evidence records for each client asset based on each client inventory record generated for each client asset. The instructions may be configured to persist the one or more client inventory records and the one or more client evidence records in a data store.

In accordance with aspects of the disclosure, a computer-implemented method may be provided for forensic software investigation. The computer-implemented method may include managing forensic investigations of client assets associated with a client based on a forensic service agreement between the client and a cloud service provider in a cloud environment. The method may include establishing the forensic service agreement between the client and the cloud service provider for servicing the forensic investigations of the client assets associated with the client. The method may include acquiring forensic data related to each client asset associated with the client, and generate one or more client inventory records for each client asset based on the forensic data related to each client asset. The method may include generating one or more client evidence records for each client asset based on each client inventory record generated for each client asset. The method may include persisting the one or more client inventory records and the one or more client evidence records in a data store.

In accordance with aspects of the disclosure, a computer-implemented method may be provided for forensic software investigation. The computer-implemented method may include managing forensic investigations of client assets associated with a client based on a forensic service agreement between the client and a cloud service provider in a cloud environment. The method may include establishing the forensic service agreement between the client and the cloud service provider for servicing the forensic investigations of the client assets associated with the client. The method may include receiving at least one request from the client for forensic investigation of the client assets associated with the client based on the forensic service agreement established between the client and the cloud service provider. The method may include acquiring forensic data related to each client asset associated with the client, and generate one or more client inventory records for each client asset based on the forensic data related to each client asset. The method may include searching the generated client inventory records for suspicious activity related to each client asset associated with the client. The method may include generating one or more client evidence records for each client asset including forensic data related to suspicious activity associated with each client asset based on each client inventory record generated for each client asset, and persisting in a data store the one or more client inventory records and the one or more client evidence records including forensic data related to suspicious activity associated with each client asset.

The details of one or more implementations are set forth in the accompanying drawings and the description below.

Other features will be apparent from the description and drawings, and from the claims.

DETAILED DESCRIPTION

Figure 1:
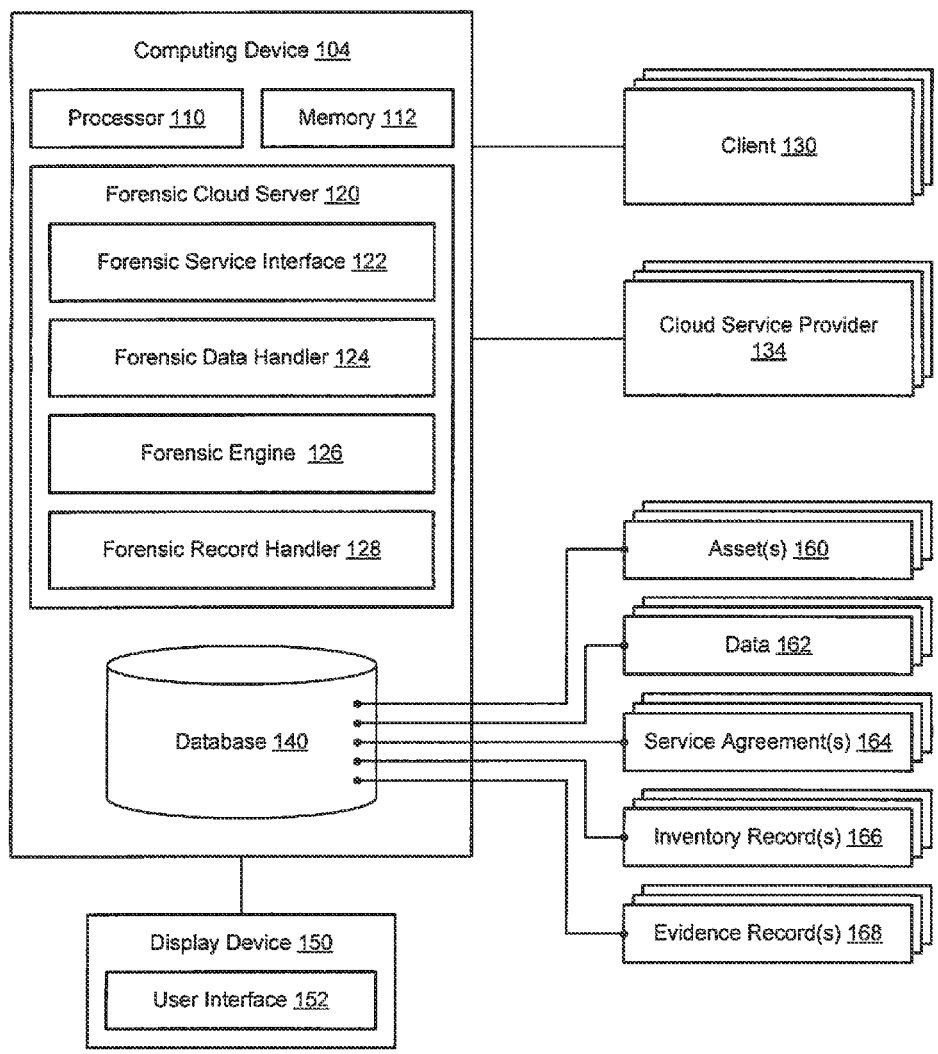
FIG. 1 is an example block diagram showing an example system for forensic software investigation, in accordance with aspects of the disclosure.

FIG. 1 is an example block diagram illustrating an example system 100 for forensic software investigation in a cloud environment, in accordance with aspects of the disclosure. In the example of FIG. 1, the system 100 comprises a computer system for implementing forensic software investigation including software Forensics as a Service (FaaS) in a cloud environment that may be associated with a computing device 104, thereby transforming the computing device 104 into a special purpose machine designed to implement various forensic software investigation process (es), methods(s), and/or technique(s), in a manner as described herein. In this instance, the computing device 104 may include standard element(s) and/or component(s), including at least one processor(s) 110, memory 112 (e.g., non-transitory computer-readable storage medium), at least one database(s) and/or data store(s) 140, power, peripherals, and various other computing element(s) and/or component (s) that may not be specifically shown in FIG. 1. Further, the system 100 may be associated with a display device 150 (e.g., a monitor or other display) that may be used to provide a user interface (UI) 152, such as, in various examples, a graphical user interface (GUI). In some examples, the UI 152 may be used to receive preferences from a user for managing or utilizing the system 100. As such, in some implementations, various other element(s) and/or component(s) of the system 100 that may be useful for purpose of implementing the system 100 may be added or included, as would be apparent to one of ordinary skill in the art.

In the example of FIG. 1, the forensic software investigation system 100 may include the computing device 104 and instructions recorded on the non-transitory computer-readable medium 112 and executable by the at least one processor 110. The system 100 may include the display device 150 for providing output to a user, and the display device 150 may include the UI 152 for receiving input from the user.

In various implementations, the example system 100 for forensic software investigation may include a system and related methods for software Forensics as a Service (FaaS) in a cloud environment. In some examples, software forensics may refer to systematic activities of digital data associated with a reported incident and analyzing such digital data with a goal of reaching some evidence either in favor or against the incident. The evidence may be produced in a court for later jurisdiction. Even though software forensics may be considered a relatively matured discipline for on-premise software solutions, aspects of the disclosure apply software forensics to a cloud environment. Further, in some examples, software forensics may refer to cloud security solutions including cloud based preventing and/or cloud based monitoring forensic data, security data, and/or suspicious activity related to malicious attacks and threats against known and unknown system vulnerabilities in a cloud environment.

In various implementations, aspects of the disclosure are associated with a generic software architecture for cloud forensics that may be provisioned as a platform service and that may also be deployed in a heterogeneous cloud service provider (CSP) environment, which may be referred to as software Forensic as a Service (FaaS). In some examples, when triggered by customer subscription, the FaaS may be configured to gather client data and/or customer data related to configurations, access history, tenants, etc. Based on this data, some meaningful reports may be generated so that clients and/or customers are able to consult with for later appropriate actions or steps. Depending on a criticality of the client and/or customer business domain, FaaS services may be consumed in flexible time spans thereby empowering clients and/or customers in some on-demand forensic investigations, in a manner as described herein.

Generally, cloud computing refers to a network computing model where programs and/or applications operate on one or more network servers connected to the cloud rather than operating on a local computing device. For instance, a user or client may connect with the one or more network servers operating in the cloud to perform various task(s) and/or process(es). Further, with cloud computing, computing process(es) may execute simultaneously on one or more network servers in the cloud to thereby utilize a networking concept referred to generally as virtualization. For instance, with virtualization, one or more physical network servers may be configured and partitioned into multiple independent servers (i.e., virtual servers) that may be configured to function independently, although appearing to the user or client as a single physical device. Such virtual network servers may be repositioned and modified (e.g., scaled up or down) at any time without affecting user or client experience in the cloud environment.

In some implementations, cloud computing may introduce a new business model where productive usage of software may no longer require on-premise deployment and installation of solutions and data to thereby leave a trust factor entirely on cloud service providers (CSPs). Technically speaking, cloud clients/customers access software services through an on-demand network of a shared pool of infrastructure (e.g., networks, servers, storage, applications, services, etc.) hosted remotely by CSPs. Sometimes, when multiple CSPs are involved in a targeted service, shared infrastructure may become heterogeneous, and due to remote deployment models and shared resources, performing investigations on security incidents in a cloud may be challenging. As such, in some cases, tenant specific security breaches, such as information disclosure of sensitive data, denial of service attempts against a customer tenant, elevation of privileges to a customer tenant, integrity violation of customer data, and/or policy violation in heterogeneous jurisdiction and multi-tenant client environment, etc. may go unnoticed.

With increasing demand of cloud based solutions both in private life and in the corporate world, technical evidence of security breaches in cloud environments may be of high significance for later litigation and criminal proceedings. For instance, analyzing trace and log information corresponding to a reported security breach and generating a report by a platform service may serve as valuable technical evidence. The sooner a CSP provides adequate forensic solutions for their cloud services, the more their trust factor may be increased in a market. As such, this may imply that CSPs should provide tool support to empower clients/customers in forensic investigations in addition to protecting client/customer data and applications in CSP datacenters. Comprehensive forensic analysis may require law enforcement grade sound practices for collecting data and may be subject to organizational and legal framework.

In some implementations, aspects of the disclosure support technology independent features. For instance, generic software architecture is provided for software forensics in a cloud environment, which may be implemented, in some examples, as a platform service. In other implementations, aspects of the disclosure support flexible service model features. For instance, depending on various business cases, the software Forensics as a Service (FaaS) may be delivered (or consumed) in various time spans, such as immediately, periodically, or continuously. In other implementations, aspects of the disclosure support handling heterogeneous CSPs. For instance, the FaaS framework may be implemented in a heterogeneous cloud service provider (CSP) environment. In particular, a FaaS service may be operated in different CSPs for Infrastructure as a Service (IaaS), Software as a Service (SaaS), or Platforms as a Service (PaaS).

In various implementations, a cloud or cloud environment may refer to software, platforms, and/or infrastructure that are provisioned as a service, e.g., remotely through the Internet. For instance, cloud servers may be configured to host software products and services from a remote location, so client based end-users may use these host software products and services remotely on a cloud based network without locally installing these host software products and services. Some models of cloud computing service include IaaS, SaaS, and PaaS, and one or more of these cloud services may be offered in a public, private, or hybrid network environment.

In the example of FIG. 1, the forensic software investigation system 100 may include a forensic cloud server 120 configured to cause the at least one processor 110 to manage forensic investigations of assets 160 including client assets associated with a client 130 based on a forensic service agreement 164 between the client 130 and a cloud service provider 134 in a cloud environment. In some implementations, the forensic cloud server 120 may include a module, an element, and/or a component of the computing device 104. In other implementations, the computing device 104 may embody the forensic cloud server 120 as a special purpose computing device configured to implement forensic software investigation, in a manner as described herein.

In various implementations, the forensic software investigation system 100 may utilize the forensic cloud server 120 as a centralized monitoring solution for the cloud environment. In some examples, the forensic cloud server 120 may be configured with some capabilities of evidence generation engine for correlating different cloud based events and/or incidents in the cloud environment, including comparing different events and event data for different computing systems and/or devices (e.g., clients versus cloud service providers) in the cloud environment.

In some implementations, the client 130 may include a computing device having hardware and/or software configured to access one or more services from one or more servers, including cloud based servers in a cloud environment. In some examples, servers in a cloud environment may include a separate computing device, where the client may access services via a wired or wireless network. Further, in some examples, a client may include a computer program or application that may rely on sending requests to another computer program, which may be located on the client or on another computing device in the cloud. For instance, web browsers may be referred to as client programs that exchange data and information with web servers and may also retrieve web pages for display to a user. In other examples, the client 130 may refer to computers or devices that run client software, or may refer to users that use client software.

In various implementations, the cloud service provider (CSP) 134 may include cloud based entities that provide remote services to one or more clients 130 in a cloud environment. In some implementations, cloud computing refers hosted services in program/application service provisioning at a remote location in the cloud. For example, end users may access cloud based programs/applications via a web browser, where client software and client data may be stored remotely on servers in the cloud. As such, in various examples, cloud computing may rely on shared resources to achieve converged infrastructure and shared services over a cloud based network.

In various implementations, the forensic investigations may be related to manually and/or automatically monitoring, locating, and/or identifying suspicious activity in a cloud environment, which may be performed in real time, live, periodically, and just-in time to thereby manage mission critical systems. In some examples, the forensic investigations may refer to quick, real time investigations of client data inventories, which may include data related to any type of sensitive information.

In various implementations, the forensic investigations may be related to data ownership for each client asset 160 associated with the client 130, including one or more of data dependency information and contract termination information. In some examples, data ownership may refer to data dependency including identifying which data is owned by which entity (e.g., network entity) in a heterogeneous jurisdiction and multi-tenant client environment. Further, lack of policy service level agreements (SLAs) and additional level of infrastructure/platform providers (IaaS/PaaS) in between CSPs and end clients may lead to dependency problems. In some examples, data ownership may refer to contract termination including determining consequences if one entity in a chain of dependency simply terminates a contract, which may complicate problems.

In various implementations, the forensic investigations may be related to data acquisition for each client asset 160 associated with the client 130, including one or more of data collection information and data preservation information. For instance, in some examples, data acquisition may refer to data collection, where client/customer data is possibly partitioned and distributed due to virtualization in different geographic data centers, which may thereby complicate data gathering. In some other examples, data acquisition data may refer to data preservation, where some client/customer data may be subject to volatility, different time zones, different laws, and/or retention policies. In some of these instances, data gathering may not be possible.

In various implementations, the forensic investigations may be related to one data analysis for each client asset 160 associated with the client 130, including one or more of filtering information and presentation information. For instance, in some examples, data analysis may refer to filtering data and information including identifying and correlating data of one or more or all involved parties with respect to suspicious events in a multi-tenant environment, where virtualized disks are not easy to achieve. In some other examples, data analysis may refer to presentation of data and information including presenting data in a manner that may be produced in a court or law.

In various implementations, the forensic investigations may be related to technical evidence generation for each client asset 160 associated with the client 130, including one or more of contextual reporting information, data encryption information, and anonymous usage information. For instance, in some examples, technical evidence generation may refer to contextual reporting including separating audit data with respect to different parties in a multi-tenant environment and their later correlation with respect to reported incidents, which may be key to reach some technical evidence. In some other examples, technical evidence generation may refer to encrypted data, including when data from different entities (e.g., business units) are persisted in an encrypted database or reside in a foreign CSP. In some of these instances, segregation of key management data and information among involved parties may be considered challenging. In some other examples, technical evidence generation may refer to anonymous usage including, e.g., anonymous usage of a cloud service. For instance, a product survey or marketing survey during a marketing campaign may limit a range of effective forensic evidence.

In various implementations, the client assets 160 may include one or more of files, networks, and tenants. In some examples, a file may include any computing resource for persistently storing data and/or information made available to a computing program/application, where a file may be considered durable in that the file may remain available for other programs/applications to access and use at another time. In some examples, networks may include various computer networks, data networks, and/or telecommunications networks that provide for computing devices to exchange data in wired or wireless communications. In computing environments, networked computing devices may be configured to exchange data with each other via data connections and links between nodes that may be established using wired or wireless media. Further, networks may include various intranets and the Internet.

In various implementations, the forensic service agreement 164 may refer to or include a subscription for Forensics as a Service (FaaS). Under FaaS subscription, the cloud service provider (CSP) 134 may be configured to expose one or more forensic functionalities related to one or more of on-demand investigation, on-demand troubleshooting, on-demand logging, on-demand auditing, low total cost of ownership (TCO) for small to medium enterprises (SME), and regulatory compliance of forensic data related to the client assets 160 associated with the client 130. Generally, total cost of ownership (TCO) may be referred to as an estimate intended to determine direct and/or indirect costs of a product or system, including computing devices and systems.

In various implementations, solutions to, remedy for, and/or prevention from security breaches may be considered a challenging task. In some examples, detecting such breaches/exploits and their further analysis may be useful not only for accountability but also for later prevention. The benefits may be mutual. For instance, clients/customers of on-demand FaaS may request immediate investigation of suspicious incidents occurred in their tenants in the past, and CSPs of FaaS may increase trust and reputation of their offered cloud services.

In various examples, some FaaS use cases are described herein below, in accordance with aspects of the disclosure. For example, on-demand investigation may include one or more immediate investigation support on suspicious transactions, periodic watchdog during important events to prevent from sabotages, and live security incidence response handling for mission critical systems. In some other examples, on-demand troubleshooting may include locating customer specific data files, virtual hosts, and physical entities. Further, on-demand troubleshooting may include locating orphan data and destroying them for privacy reasons, determining root causes of an event and prevent from recurrences, recovering data that has been deleted accidentally or intentionally, and to rollback a system to a known consistent state. Further, on-demand troubleshooting may include resolving functional and operational issues. In other examples, on-demand logging/auditing may include complete logging during a special event for detailed reporting, analyzing and correlating log entries across multiple tenants and/or systems, tracing a suspicious event and notifying impacted parties, and supporting external auditors with relevant logging. In other examples, low TCO for SMEs may refer to SMEs that may not be able to afford their own forensic implementations, and therefore, services may rely on their CSPs for protecting them from security breaches. In other examples, regulatory compliance may include assisting clients in complying with geography specific financial, governmental, and privacy regulations.

The forensic cloud server 120 may include a forensic service interface 122 configured to establish the forensic service agreement 164 between the client 130 and the cloud service provider 134 for servicing the forensic investigations of the client assets 160 associated with the client 130. In some implementations, the forensic service interface 122 may include an application programming interface (API) including a forensic service API associated with the forensic service agreement 164. In case of multiple cloud service providers (CSPs) involved, the interface may be configured to capture agreement(s) between the client and each CSP and also agreement(s) between multiple CSPs.

The forensic cloud server 120 may include a forensic data handler 124 configured to acquire data 162 including forensic data related to each client asset 160 associated with the client 130, and generate one or more client inventory records 166 for each client asset 160 based on the forensic data 162 related to each client asset 160. In some implementations, the forensic data 162 may include data related to one or more of client configuration, network configuration, memory configuration, tenant configuration, historical data, file metadata, and user access history data. Further, in some examples, the forensic data 162 may be related to business related activities, including, e.g., data related to review of periodic purchase orders, review of client history (e.g., client access history, client login history, client purchase history, etc.), review of client order history for determining, identifying, locating suspicious orders, false orders, etc.

In some implementations, the forensic data handler 162 may be configured to retrieve relevant data from the cloud service provider (CSP) 134 including tenant information related to the client 130. Further, in some implementations, the forensic data handler 162 may be configured to cluster different forensic data 162 related to the client assets 160 into dedicated sub-components for the one or more client inventory records 166. In various examples, the dedicated sub-components of the client inventory records 166 may include one or more of client inventory, file inventory, network inventory, memory inventory, tenant inventory, and user activity inventory.

The forensic cloud server 120 may include at least one forensic engine 126 configured to generate one or more client evidence records 168 for each client asset 160 based on each client inventory record 166 generated for each client asset 160. In some implementations, the one or more client evidence records 168 may include various data related to identifying client upload history, client file history, client tenant history, and client responsibility history related to the one or more client inventory records 166.

In some examples, the forensic engine 126 may be configured with some capabilities of evidence generation for correlating different cloud based events and/or incidents in a cloud environment, including comparing different events/incidents and/or event data/incident data for different computing systems and/or devices (e.g., client 130 versus cloud service provider 134) in the cloud environment.

In some examples, the forensic engine 126 may be referred to as an evidence engine and may be configured to describe, define, and/or apply one or more rules to or as part of one or more evidence records that may raise a notification or an alarm, where this notification/alarm may notify/indicate one or more suspicious activities. The forensic engine 126 may include one or more components including an evidence definition engine or component that may be configured to describe/define one or more expected behaviors of the parties (e.g., the client and/or the CSP) in different chains (e.g., service chains) in terms of describing/defining different events and/or incidents including suspicious events, suspicious incidents, and/or suspicious occurrences.

In some implementations, the evidence engine may include functionality of a correlation engine or component that may be configured to correlate between different events and/or incidents including suspicious events and/or incidents. The correlation engine or component may be configured to execute one or more different correlations between different events and/or incidents to thereby provide one or more results where there may be some evidence and/or where there may be something evident or not. Further description is provided herein in reference to FIG. 3.

The forensic cloud server 120 may include a forensic record handler 128 configured to persist the one or more client inventory records 166 and the one or more client evidence records 168 in at least one data store (e.g., database 140). In various implementations, the data store and/or database 140 may be configured to persist, record, and/or store various data and information related to asset(s) 160 including client asset(s), data 164 including forensic data and client related data, service agreement(s) 164 including forensic service agreement(s), inventory record(s) 166 including forensic inventory record(s), and evidence record(s) 168 including forensic evidence record(s).

In the example of FIG. 1, the computing device 104 (e.g., including the forensic cloud server 120 and the forensic engine 126) may be deployed in the forensic software investigation system 100 along with one or more clients 130 and one or more cloud service providers 134. In various examples, the forensic cloud server 120 and the forensic engine 126 may be configured to centrally manage and/or monitor multiple different events and/or incidents in the cloud environment. As such, the forensic cloud server 120 and the forensic engine 126 may be configured to correlate and/or compare data related to these multiple different events and/or incidents in the cloud environment to thereby identify security breaches and malicious attacks and threats that are occurring and/or that have occurred in the cloud environment, so that protective measures may be applied to the cloud environment to thereby inhibit and/or prevent security breaches and malicious attacks and threats to the cloud environment in the present or future.

In the example of FIG. 1, it should be appreciated that the system 100 is illustrated using various functional blocks or modules that represent more-or-less discrete functionality. However, such illustration is provided for clarity and convenience, and thus, it should be appreciated that the various functionalities may overlap or be combined within a described block(s) or module(s), and/or may be implemented by one or more block(s) or module(s) not specifically illustrated in the example of FIG. 1. As such, it should be appreciated that conventional functionality that may be considered useful to the system 100 of FIG. 1 may be included as well even though such conventional elements are not illustrated explicitly, for the sake of clarity and convenience.

Figure 2:
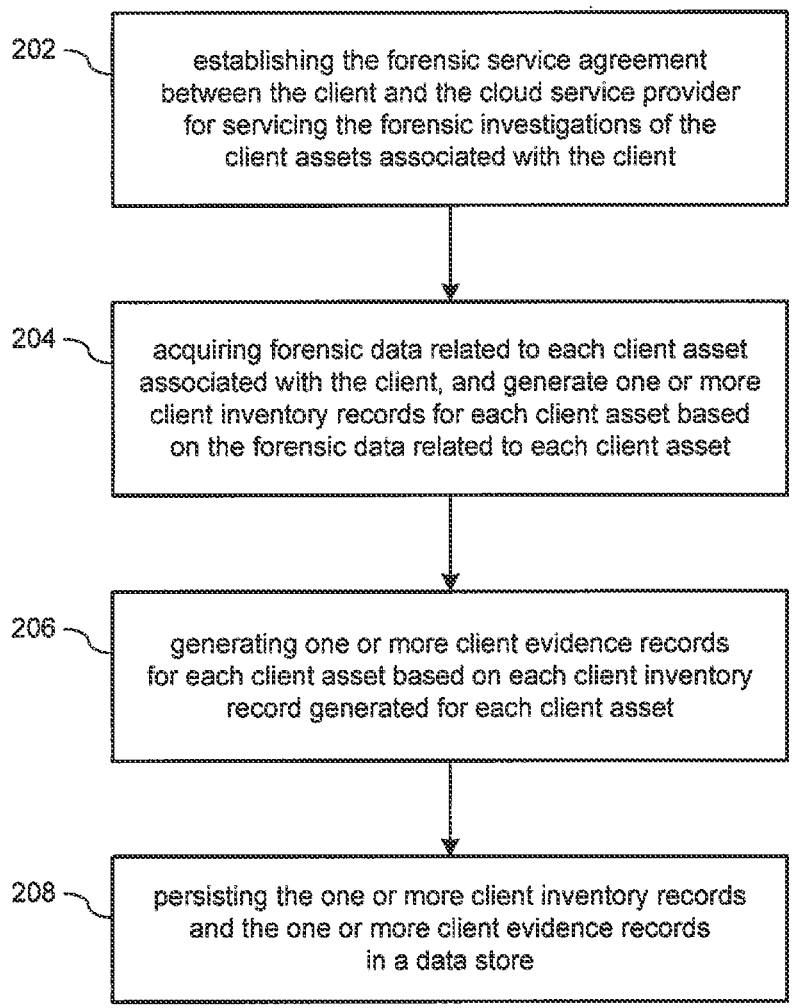
FIG. 2 is an example process flow showing an example method for forensic software investigation, in accordance with aspects of the disclosure.

FIG. 2 is an example process flow illustrating an example method 200 for forensic software investigation in a cloud environment, in accordance with aspects of the disclosure. In the example of FIG. 2, operations 202-208 are illustrated as discrete operations occurring in sequential order. However, it should be appreciated that, in other various implementations, two or more of the operations 202-208 may occur in a partially or completely overlapping or parallel manner, or in a nested or looped manner, or may occur in a different order than that shown. Further, additional operations, that may not be specifically shown in the example of FIG. 2, may be included in some implementations, while, in various other implementations, one or more of the operations 202-208 may be omitted. Further, in various implementations, the method 200 may include a process flow for a computer-implemented method for forensic software investigation in the system 100 of FIG. 1. Further, as described herein, the operations 202-208 may provide a simplified operational process flow that may be enacted by the computer system 104 to provide features and functionalities as described in reference to FIG. 1.

In various aspects of the disclosure, the example method 200 of FIG. 2 may be provided for managing forensic investigations of client assets associated with a client based on a forensic service agreement between the client and a cloud service provider (CSP) in a cloud environment. In some examples, the client may include one or more clients, and the CSP may include one or more CSPs. In some other examples, the at the least one forensic service agreement may include multiple different forensic service agreements between one or more clients and one or more CSPs.

For instance, at 202, the example method 200 may include establishing the forensic service agreement between the client and the cloud service provider for servicing the forensic investigations of the client assets associated with the client. At 204, the example method 200 may include acquiring forensic data related to each client asset associated with the client, and generate one or more client inventory records for each client asset based on the forensic data related to each client asset. At 206, the example method 200 may include generating one or more client evidence records for each client asset based on each client inventory record generated for each client asset. At 208, the example method 200 may include persisting the one or more client inventory records and the one or more client evidence records in a data store and/or database.

In some implementations, the forensic investigations may be related to data ownership, data acquisition, data analysis, and technical evidence generation for each client asset associated with the client, and the client assets may include one or more of files, networks, and tenants. Further, the forensic service agreement may include a subscription for Forensics as a Service (FaaS), and under the FaaS subscription, the cloud service provider is configured to expose one or more forensic functionalities related to one or more of on-demand investigation, troubleshooting, auditing, and logging of forensic data related to the client assets associated with the client. Further, the forensic data includes data related to one or more of client configuration, network configuration, memory configuration, tenant configuration, historical data, file metadata, and user access history data. Further, the client evidence records may include data related to identifying client upload history, client file history, client tenant history, and client responsibility history related to client inventory records. In case of multiple cloud service providers (CSPs) involved, the interface may be configured to capture agreement(s) between the client and each CSP and also agreement(s) between multiple CSPs.

Further, in some implementations, the example method 200 may include retrieving relevant data from the cloud service provider including tenant information related to the client. Further, in some other implementations, the example method 200 may include clustering different forensic data related to the client assets into dedicated sub-components for the one or more client inventory records.

As described herein, cloud forensics may refer to organizational and legal aspects to deal with, apart from technicality. For instance, technical challenges in cloud forensics may stem from organizational and legal dimensions that may complicate data retrieval process(es). The following may summarize some challenges among others for implementing a generic FaaS framework in a cloud environment.

In some examples, data ownership may refer to data dependency, such as identifying which data is owned by which entity in a heterogeneous jurisdiction and in a multi-tenant client environment. Moreover, lack of policy (e.g., SLAs) and additional levels of infrastructure and/or platform providers (IaaS/PaaS) in between CSPs and end clients/customers may lead to dependency issues and, sometimes, chaos. Further, data ownership may refer to contract termination, such as determining consequences if one in a chain of dependency simply terminates a contract, which may complicated.

With no intermediate service providers, i.e., IaaS/PaaS, in between the CSP and client/customer data ownership may be relatively simple to determine. When multiple service providers are involved in a chain one or more or all of them may come up with an agreement, which may be a challenging task. For instance, current setup of some developer services in a cloud may introduce at least two levels of service providers where a CSP provides infrastructure and a client plays the role of a database PaaS. In this context, one or more clear agreements may mandate customer asset ownership and terms and conditions of termination of contracts of any party.

In some examples, data acquisition may refer to data collection, where client/customer data may likely be partitioned and/or distributed due to virtualization in different geographic data centers and thereby possibly complicating data gathering. In some examples, data acquisition may refer to data preservation, where client/customer data may be subject to volatility, different time zones, different laws, and/or retention policy. In some instances, data gathering may not be possible.

Technically speaking, data that needs to be retrieved during an acquisition phase may include, for example, one or more of configuration data, historical data, tenant access information, trace data, logs, etc. Data acquisition in on-premise scenario may rely on various tools and services. However, data acquisition in a cloud may require an expert knowledge of utilizing for instance virtual introspection and snapshot. In some instances, data acquisition may be performed in a single CSP scenario as opposed to a multiple CSP scenario. Further, in some instances, once data ownership is settled, data acquisition may become an achievable task.

In some examples, data analysis may include filtering, where identifying and correlating data of all involved parties with respect to a suspicious event in a multi-tenant environment and virtualized disks may not be easy to achieve. In some examples, data analysis may include presentation, where presenting data in a manner that may be produced in a court of law. Filtering the collected data according to a reported security incident may be a key activity to reach some evidence. Data presentation techniques may depend on reported events and regions. For instance, some countries may not accept a digital signature as a legal signature of an entity and, as such, may not be useful.

In some examples, technical evidence generation may include contextual reporting, where separating audit data with respect to different parties in a multi-tenant environment, and their later correlation with a reported incident may be a key to reach some technical evidence. In some examples, technical evidence generation may include encrypted data, including when data from different business units are persisted in an encrypted database or resides in a foreign CSP, segregation of key management among involved parties may be a challenging task. In some other examples, technical evidence generation may include anonymous usage including anonymous usage of a cloud service, where for instance, a product survey or a marketing survey during a marketing campaign may limit a range of effective evidence.

In some examples, data analysis and technical evidence generation may refer or require that collected forensic data may be modeled in a meaningful way so that automated evidence reports may be delivered. Such a data model may be represented by, for instance, ontology, XML schema, or even raw tables reflecting various semantics and structure of different inventory data and information. Further, to reach some evidence, inventory records may be compared with, for instance, a common vulnerability database model, and in case of a match, a favorable report may confirm a security incident.

Figure 3:
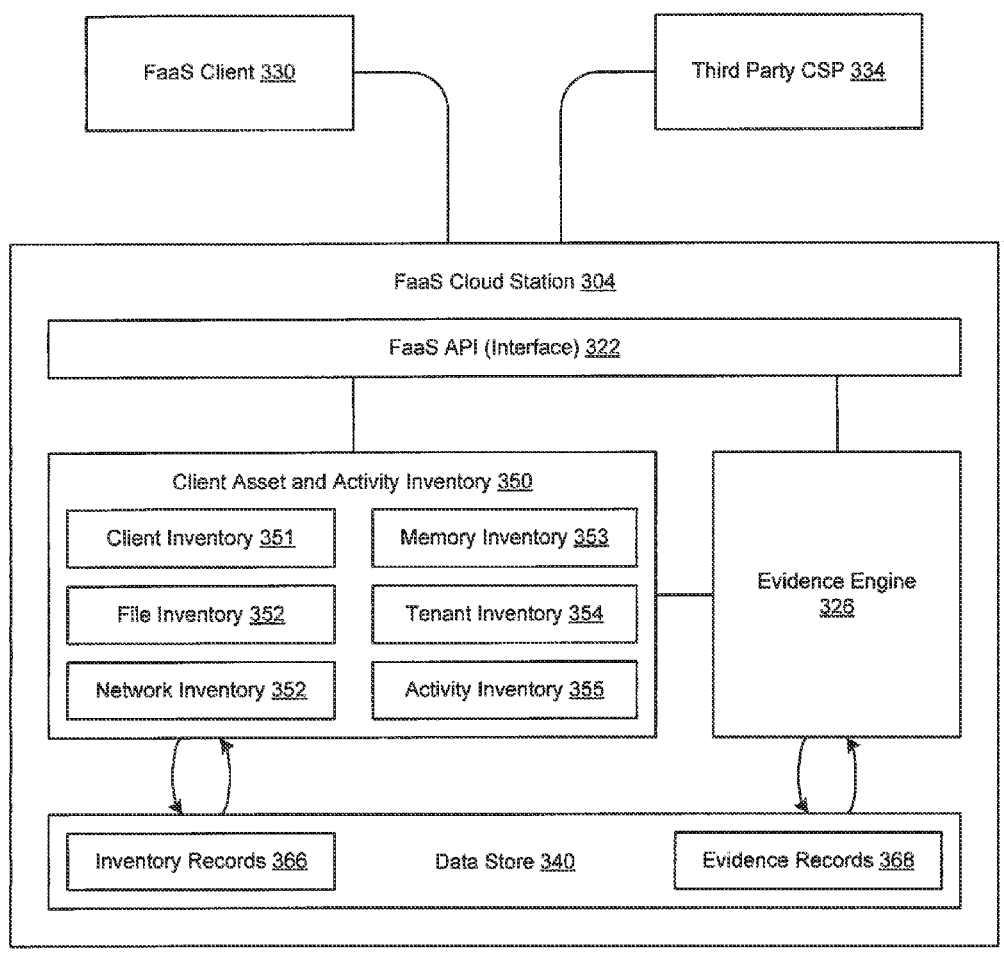
FIG. 3 is an example block diagram showing an example architecture for forensic software investigation, in accordance with aspects of the disclosure.

FIG. 3 is an example block diagram showing an example architecture 300 for forensic software investigation in a cloud environment, in accordance with aspects of the disclosure. In particular, FIG. 3 shows an example FaaS architectural framework that may take one or more of the abovementioned use cases and/or technical challenges into account. As described herein, aspects of the disclosure provide some technical domains of cloud forensics. For instance, data ownership may be directly related to organizational and legal dimension and thus may not refer to a technical dimension.

In the example of FIG. 3, the example architecture 300 may include a FaaS architecture configured to ensure low TCO by definition of Software as a Service (SaaS). The example architecture 300 may imply that the architectural components of FaaS are deployed in and managed by a third-party CSP 3324 as opposed to a client or customer 330. In some examples, the client/customer 330 may consume a FaaS service similar to any other cloud service. Depending on time spans, different FaaS subscription models may be configured in a manner as described herein.

The example FaaS architecture 300 may include a FaaS cloud station 304 configured to manage one or more or all requests of a client/customer 330 (e.g., FaaS client) that may be sent to the CSP 334 (e.g., endpoint) as represented by the FaaS cloud station 304. In some examples, the FaaS cloud station 304 may be a proxy, node, etc. exposing a web service for instance. The FaaS cloud station 304 may determine whether forensic investigation (e.g., data ownership, data acquisition, data analysis, and technical evidence) may be necessary and may require information from third party CSPs, such as CSP 334. If necessary and/or required, the FaaS cloud station 304 may retrieve relevant data from other CSPs before forwarding a FaaS request to the CSP backend, such as CSP 334. For instance, some database services in a cloud may oblige the client 330 or the CSP 334 to communicate with a cloud for actual client/customer tenant information.

The FaaS cloud station 304 (e.g., FaaS backend) may include an interface layer 322 (FaaS API). The FaaS API 322 may be configured to establish an agreement of the CSP 334 with potential FaaS clients/customers 330, who may choose an appropriate FaaS subscription. Under subscription, the CSP 334 may expose forensic functionalities as described herein, for instance, on-demand investigation, on-demand troubleshooting, on-demand auditing/logging, etc. Being an interface, this layer 322 may be responsible for converting FaaS requests/responses to and from an inventory layer 350. In case of multiple CSPs involved, the interface may be configured to capture agreement(s) between the client and each CSP and also agreement(s) between multiple CSPs.

The FaaS cloud station 304 may include an inventory layer 350 configured to perform data acquisition and data analysis. The inventory layer 350 may be referred to as a client asset and activity inventory component configured to cluster different forensic data of customer assets (e.g., file, network, tenant, etc.) including, for instance, client configuration, network configuration, memory configuration, tenant configuration, their historical data, file metadata, user access history into dedicated sub-components referred to as inventories. For each asset, there may exist an inventory to manage forensic data associated therewith. For instance, to identify which user has uploaded which files on which tenant and at what time, the responsible inventories may include client inventory 351, file inventory 352, and tenant inventory 354, respectively. As described herein, inventories may be used in evidence generation by evidence engine 326.

In some implementations, the evidence engine 326 may be referred to as a forensic engine (e.g., forensic engine 126) and may be configured to describe, define, and/or apply one or more rules to or as part of one or more evidence records that may raise a notification or an alarm, where this notification/alarm may notify/indicate one or more suspicious activities. Further, in some implementations, the evidence engine 326 may include functionality of a correlation engine configured to correlate between different events and/or incidents including suspicious events and/or incidents.

The client asset and activity inventory layer 350 may include the client inventory 351 that may be used to keep one or more records of client/customer PC's OS, installed programs including software. For each file upload and download, related events such as who, when, what, and where may be persistently stored in the file inventory 352, and client/customer network related information may be stored in a network inventory 352. In some examples, the network inventory 352 may require a special agreement with the client/customer 330 as customer's in-house network data may be captured and stored in the network inventory 352. Further, a memory inventory 353 may be configured to capture meta-information about memory usage for customer requests. Still further, the tenant inventory 354 may be configured to keep track of tenant management activity, for instance, tenant provisioning/decommissioning by a third party, tenant size, etc. In some other examples, an activity inventory 355 may be used to keep track and store data and information related to various activities of the inventory layer 350. Further, each of the inventories may be persisted in a data store 340 or a database.

The FaaS cloud station 304 may include an evidence engine 326 that may be configured to filter out irrelevant information from the inventory and separate related events corresponding to an original FaaS request. Based on these events, a meaningful report showing suspicious traces, logs, and a summary may be delivered as part of some reports which may then be persisted in the data store 340. Such a report may serve the purpose of technical evidence for on-demand investigation or logging/auditing. For an on-demand trouble shooting service, FaaS reports may include root cause analysis of any functional anomalies found in the FaaS system architecture 300.

The FaaS cloud station 304 may include the data store layer 340 that may be configured to support on-demand investigation in various subscription models, where inventory records 366 and evidence records 368 may be persisted in one or more data stores and/or databases. The data store layer 340 may be responsive to analyze large amounts of data in real time, such as, for instance, data related to motor racing or nuclear industries. In this context, in-memory type databases may be a useful technology that provides both speed and size.

In various implementations, the FaaS cloud station 304 may be configured to enable multiple CSPs 334 to interact in a heterogeneous cloud environment. The data store layer 340 and the interface layer 322 may be configured to provide persistency and interoperability, and the inventory layer 350 may be configured to manage forensic data and evidence. The FaaS architecture 300 may be implemented as a platform service in a heterogeneous CSP environment, for instance, a FaaS as a platform service of java-based cloud environments. Further, the inventory data may essentially be managed by the CSP 334, where a trust factor of CSPs in this context may play a vital role. In some examples, one way to increase the trust factor may be to use a trusted platform module that enables clients/customers to verify confidentiality and integrity of the inventory data.

In some examples, cloud computing may refer to a computing hardware machine or device or group of computing hardware machines or devices, such as, for instance, referred as a server or servers in a server group that may be connected in a cloud environment or through a communication network, such as, for example, the Internet, an intranet, a local area network (LAN), or wide area network (WAN). In some examples, the cloud computing environment may include one or more clients, including one or more individual users, having permission to access remote services of the one or more servers in the cloud environment, where remote services that may be accessed may include one or more using server processing to run an application, store data, and/or perform other computing tasks. As such, instead of using a local computing device to run applications and/or perform tasks, the client/user in the cloud may use remote services of the one or more servers in the cloud to run an application and/or perform tasks. Further, cloud computing provides cloud resource assistance and benefits to clients/users in a cloud including on-demand services, on-demand access across multiple cloud devices, and on-demand resource pooling via cloud computing capability.

Figure 4:
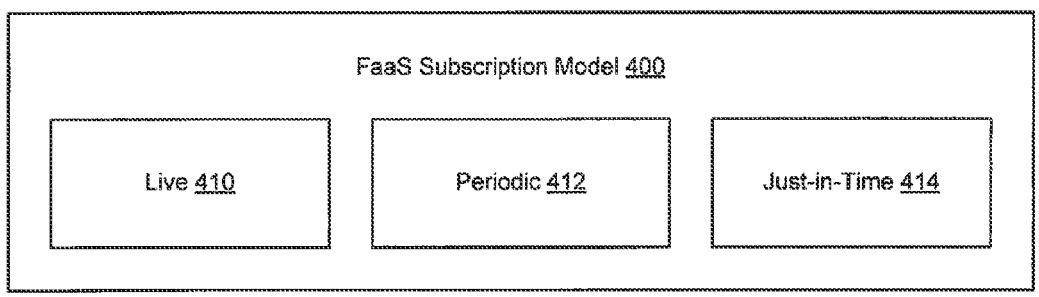
FIG. 4 is an example block diagram showing an example subscription model for forensic software investigation, in accordance with aspects of the disclosure.

FIG. 4 is an example block diagram showing an example subscription model 400 for forensic software investigation in a cloud environment, in accordance with aspects of the disclosure. In particular, the example subscription model 400 may include a software Forensic as a Service (FaaS) subscription model.

In some implementations, the FaaS service may be configured to provide forensic reports corresponding to other subscribed services. Depending on business cases of the service, different time spans and deployment models of FaaS subscriptions may be setup, in a manner as described herein. An appropriate FaaS subscription may essentially assist a client/user/customer to be prepared for external audits. While use cases may be supported by subscription models, an effective time span and deployment model may be determined by a criticality of business cases. As such, in some examples, FaaS services may be subscribed in one or more different modes, including Live FaaS, Periodic FaaS and Just-in-time FaaS, in a manner as described herein.

In some examples, Live FaaS 410 may refer to keeping inventories alive throughout a whole service operation, which is a difference of a live FaaS as opposed to other FaaS subscriptions. Further, mission critical services may include, e.g., nuclear industries and health care domains, and may not afford losing system access/log/history records for a single minute and therefore may require live or real time FaaS. Since a live FaaS subscription may refer to and/or may deal with critical services, a dedicated data persistency layer as opposed to a physically shared data store may be deployed. As such, this separation may make the live FaaS service more secure and resilient.

In some examples, Periodic FaaS 412 may refer to the CSP providing a periodic FaaS during a special event running by the client/user/customer. During this period, the CSP may keep one or more or all inventories running so as to be ready for evidence generation whenever asked by the client/user/customer. For instance, marketing campaigns or survey campaigns may run for a limited period of time and may not need 24 hours surveillance. In this case, a periodic FaaS may be appropriate here. In other cases, the client/user/customer event may be considered critical, and a dedicated data store may also be deployed in a manner similar to live FaaS.

In some examples, Just-in-Time FaaS 414 may refer to a just-in-time FaaS that may be triggered by specific investigation requests from FaaS client. In some cases, independent of FaaS subscription, the CSP may be configured to maintain inventories for each cloud client/user/customer so as to be capable of providing FaaS service in any time span. For instance, in some cases, a client/user/customer having neither a subscription of a periodic FaaS nor a live FaaS may notice some suspicious transactions in one or more tenants in a given period of time. Therefore, in this scenario, client/user/customer may request an immediate investigation, and just-in-time FaaS may be configured to expressly support these types of scenarios for specific requests.

Figure 5:
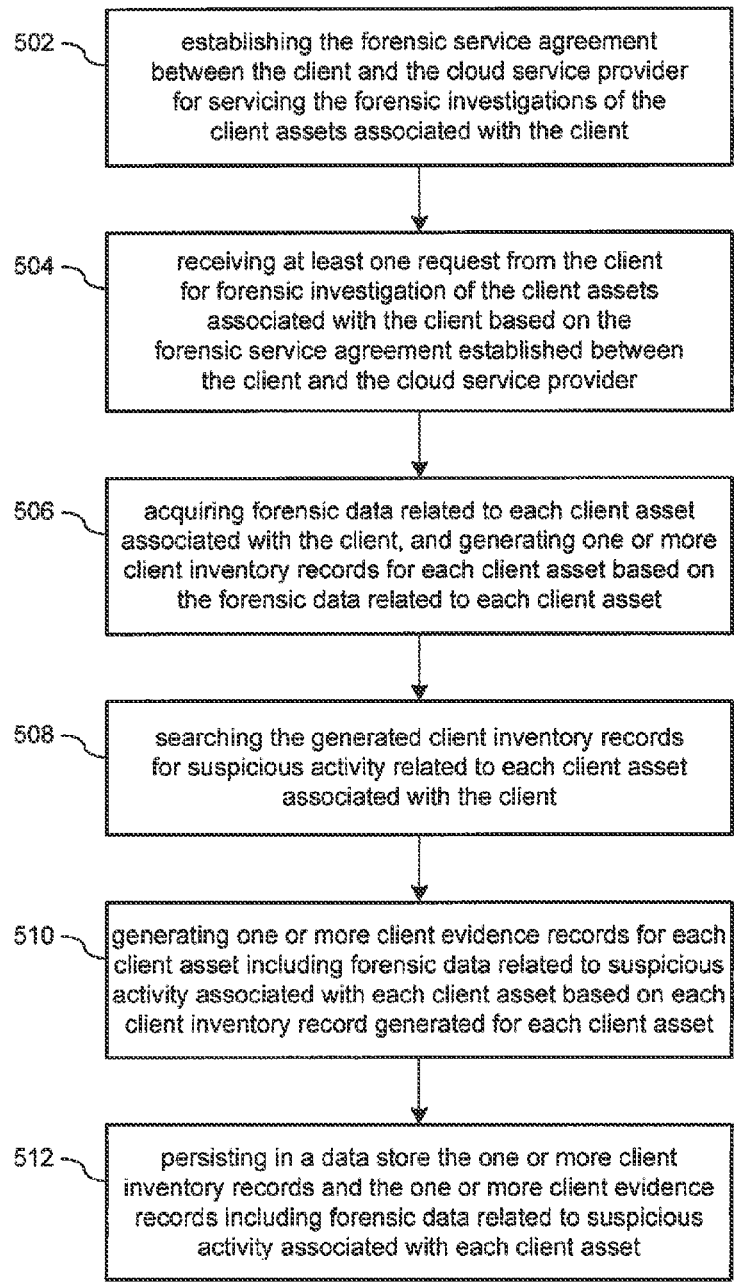
FIG. 5 is an example process flow illustrating another example method for forensic software investigation, in accordance with aspects of the disclosure.

FIG. 5 is an example process flow illustrating another example method 500 for forensic software investigation in a cloud environment, in accordance with aspects of the disclosure. In the example of FIG. 5, operations 502-512 are illustrated as discrete operations occurring in sequential order. However, it should be appreciated that, in other various implementations, two or more of the operations 502-512 may occur in a partially or completely overlapping or parallel manner, or in a nested or looped manner, or may occur in a different order than that shown. Further, additional operations, that may not be specifically shown in the example of FIG. 5, may be included in some implementations, while, in various other implementations, one or more of the operations 502-512 may be omitted. Further, in various implementations, the method 500 may include a process flow for a computer-implemented method for forensic software investigation in the system 100 of FIG. 1. Further, as described herein, the operations 502-512 may provide a simplified operational process flow that may be enacted by the computer system 104 to provide features and functionalities as described in reference to FIG. 1.

In various aspects of the disclosure, the example method 500 of FIG. 5 may be provided for managing forensic investigations of client assets associated with a client based on at least one forensic service agreement between the client and a cloud service provider (CSP) in a cloud environment. In some examples, the client may include one or more clients, and the CSP may include one or more CSPs. In some other examples, the at the least one forensic service agreement may include multiple different forensic service agreements between one or more clients and one or more CSPs.

For instance, at 502, the example method 500 may include establishing the forensic service agreement between the client and the cloud service provider for servicing the forensic investigations of the client assets associated with the client. At 504, the example method 500 may include receiving at least one request from the client for forensic investigation of the client assets associated with the client based on the forensic service agreement established between the client and the cloud service provider. At 506, the example method 500 may include acquiring forensic data related to each client asset associated with the client, and generating one or more client inventory records for each client asset based on the forensic data related to each client asset. At 508, the example method 500 may include searching the generated client inventory records for suspicious activity related to each client asset associated with the client. At 510, the example method 500 may include generating one or more client evidence records for each client asset including forensic data related to suspicious activity associated with each client asset based on each client inventory record generated for each client asset. At 512, the example method 500 may include persisting in a data store (e.g., a database, such as database(s)140) the one or more client inventory records and the one or more client evidence records including forensic data related to suspicious activity associated with each client asset.

In some implementations, the example method 500 may include locating evidence of suspicious activity in the forensic data associated with the client and/or client assets associated with the client. The example method 500 may include comparing client data including forensic data related to different client assets. The example method 500 may include determining infrastructure involved in one or more service chains between the client and the CSP. The example method 500 may include evaluating the evidence records to determine/identify suspicious activity in the inventory records including client data and/or forensic data associated with the client. The example method 500 may include evaluating client data and forensic data in the inventory records to detect suspicious activity including evidence of suspicious activity.

In some implementations, the example method 500 may include describing or defining one or more rules as part of evidence records that may raise a notification or an alarm, where this notification/alarm may notify/indicate suspicious activity to the system, the client, the CSP, etc. In some examples, the evidence records may describe one or more expected behaviors of involved parties (e.g., the client and or the CSP) in different chains (e.g., service chains) in terms of defining events and/or incidents including suspicious events and/or incidents. Further, in other examples, the evidence records may describe correlations between different events and/or incidents. The examples method 200 may include correlating different events and/or incidents and executing correlations between different events and/or incidents to thereby provide one or more results where there may be some evidence or where there may be something evident or not.

In some implementations, the forensic investigations may be related to data ownership, data acquisition, data analysis, and technical evidence generation for each client asset associated with the client, and the client assets may include one or more of files, networks, and tenants. Further, the forensic service agreement may include a subscription for Forensics as a Service (FaaS), and under the FaaS subscription, the cloud service provider is configured to expose one or more forensic functionalities related to one or more of on-demand investigation, troubleshooting, auditing, and logging of forensic data related to the client assets associated with the client. Further, the forensic data includes data related to one or more of client configuration, network configuration, memory configuration, tenant configuration, historical data, file metadata, and user access history data. Further, the client evidence records may include data related to identifying client upload history, client file history, client tenant history, and client responsibility history related to client inventory records.

Further, in some implementations, the example method 500 may include retrieving relevant data from the cloud service provider including tenant information related to the client. Further, in some other implementations, the example method 500 may include clustering different forensic data related to the client assets into dedicated sub-components for the one or more client inventory records.

In various implementations, aspects of the disclosure provide a software forensic framework for cloud-based services to identify technical challenges and potential business cases of FaaS investigation services. Further, aspects of the disclosure provide various different service models (e.g., Live FaaS, Periodic FaaS, Just-in-Time FaaS) for covering one or more or all time spans for a client/user/customer in a cloud. As such, the FaaS solution may include a generic architectural framework that may be implemented as a platform service in a heterogeneous CSP environment.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, may be written in any form of programming language, including compiled or interpreted languages, and may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any type of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for user interaction, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other types of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of networks, such as communication networks, may include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer system including instructions recorded on a non-transitory computer-readable medium and executable by at least one processor, the system comprising:
a server configured to cause the at least one processor to manage forensic investigations of client assets associated with a client based on a forensic service agreement between the client and a cloud service provider in a cloud environment, the server including:
a forensic service interface configured to establish the forensic service agreement between the client and the cloud service provider for servicing the forensic investigations of the client assets associated with the client, the forensic service interface providing multiple modes for the forensic service agreement, the multiple modes including at least:
(i) a first mode where the server is configured to manage the forensic investigations in real time on an ongoing basis; (ii) a second mode where the server is configured to manage the forensic investigations for an event during a time period specified by the client; and (iii) a third mode where the server is configured to manage the forensic investigations on a just-in-time basis in response to an investigation request from the client;
a forensic data handler configured to acquire forensic data related to each client asset associated with the client, wherein the forensic data handler acquires the forensic data in real time on an ongoing basis when the forensic service agreement specifies the first mode, wherein the forensic data handler acquires the forensic data for the event during the time period when the forensic service agreement specifies the second mode, and wherein the forensic data handler acquires the forensic data on a just-in-time basis when the forensic service agreement specifies the third mode, and generate one or more client inventory records for each client asset based on the forensic data related to each client asset; and
a forensic engine configured to generate one or more client evidence records for each client asset based on each client inventory record generated for each client asset;
wherein the forensic service agreement includes a subscription for Forensics as a Service (FaaS), and under the FaaS subscription, the cloud service provider is configured to expose one or more forensic functionalities related to one or more of on-demand investigation, troubleshooting, auditing, and logging of forensic data related to the client assets associated with the client.

2. The system of claim 1, wherein the forensic investigations are related to data ownership for each client asset associated with the client, including one or more of data dependency information and contract termination information.

3. The system of claim 1, wherein the forensic investigations are related to data acquisition for each client asset associated with the client, including one or more of data collection information and data preservation information.

4. The system of claim 1, wherein the forensic investigations are related to one data analysis for each client asset associated with the client, including one or more of filtering information and presentation information.

5. The system of claim 1, wherein the forensic investigations are related to technical evidence generation for each client asset associated with the client, including one or more of contextual reporting information, data encryption information, and anonymous usage information.

6. The system of claim 1, wherein the client assets include one or more of files, networks, and tenants.

7. The system of claim 1, wherein the forensic data includes data related to one or more of client configuration, network configuration, memory configuration, tenant configuration, historical data, file metadata, and user access history data.

8. The system of claim 1, wherein the forensic service interface includes forensic service application programming interface (API) associated with the forensic service agreement.

9. The system of claim 1, wherein the forensic data handler is configured to:
retrieve relevant data from the cloud service provider including tenant information related to the client; and
cluster different forensic data related to the client assets into dedicated sub-components for the one or more client inventory records.

10. The system of claim 1, further comprising:
a forensic record handler configured to persist the one or more client inventory records and the one or more client evidence records in a data store.

11. The system of claim 1, wherein the one or more client evidence records include data related to identifying client upload history, client file history, client tenant history, and client responsibility history related to client inventory records.

12. The computer system of claim 1, further comprising an FaaS cloud station configured to enable multiple cloud service providers to interact in a heterogeneous cloud environment.

13. The computer system of claim 1, wherein when the forensic investigations include the data dependency information, the data ownership involves data dependency including identifying which data is owned by which entity in a heterogeneous jurisdiction and multi-tenant client environment, and wherein when the forensic investigations include the contract termination information, the data ownership involves contract termination including determining consequences if one entity in a chain of dependency terminates a contract.

14. A computer program product, the computer program product tangibly embodied on a non-transitory computer-readable storage medium and including instructions that, when executed by at least one processor, are configured to:
manage forensic investigations of client assets associated with a client based on a forensic service agreement between the client and a cloud service provider in a cloud environment, the instructions configured to:
establish the forensic service agreement between the client and the cloud service provider for servicing the forensic investigations of the client assets associated with the client, wherein multiple modes are provided for the forensic service agreement, the multiple modes including at least: (i) a first mode where the forensic investigations are managed in real time on an ongoing basis; (ii) a second mode where the forensic investigations are managed for an event during a time period specified by the client; and (iii) a third mode where the forensic investigations are managed on a just-in-time basis in response to an investigation request from the client;

acquire forensic data related to each client asset associated with the client, wherein the forensic data is acquired in real time on an ongoing basis when the forensic service agreement specifies the first mode, wherein the forensic data is acquired for the event during the time period when the forensic service agreement specifies the second mode, and wherein the forensic data is acquired on a just-in-time basis when the forensic service agreement specifies the third mode, and generate one or more client inventory records for each client asset based on the forensic data related to each client asset;

generate one or more client evidence records for each client asset based on each client inventory record generated for each client asset; and persist the one or more client inventory records and the one or more client evidence records in a data store;

wherein the forensic service agreement includes a subscription for Forensics as a Service (FaaS), and under the FaaS subscription, the cloud service provider is configured to expose one or more forensic functionalities related to one or more of on-demand investigation, troubleshooting, auditing, and logging of forensic data related to the client assets associated with the client.

15. The computer program product of claim 14, wherein:
the forensic investigations are related to data ownership, data acquisition, data analysis, and technical evidence generation for each client asset associated with the client, and the client assets include one or more of files, networks, and tenants.

16. The computer program product of claim 14, wherein the forensic data includes data related to one or more of client configuration, network configuration, memory configuration, tenant configuration, historical data, file metadata, and user access history data.

17. The computer program product of claim 14, further including instructions configured to retrieve relevant data from the cloud service provider including tenant information related to the client.

18. The computer program product of claim 14, further including instructions configured to cluster different forensic data related to the client assets into dedicated sub-components for the one or more client inventory records.

19. The computer program product of claim 14, wherein the one or more client evidence records include data related to identifying client upload history, client file history, client tenant history, and client responsibility history related to client inventory records.

20. A computer-implemented method, comprising:
managing forensic investigations of client assets associated with a client based on a forensic service agreement between the client and a cloud service provider in a cloud environment, including:

establishing the forensic service agreement between the client and the cloud service provider for servicing the forensic investigations of the client assets associated with the client, including provision of multiple modes for the forensic service agreement, the multiple modes including at least: (i) a first mode where the forensic investigations are managed in real time on an ongoing basis; (ii) a second mode where the forensic investigations are managed for an event during a time period specified by the client; and (iii) a third mode where the forensic investigations are managed on a just-in-time basis in response to an investigation request from the client;

receiving at least one request from the client for forensic investigation of the client assets associated with the client based on the forensic service agreement established between the client and the cloud service provider;

acquiring forensic data related to each client asset associated with the client, wherein the forensic data is acquired in real time on an ongoing basis when the forensic service agreement specifies the first mode, wherein the forensic data is acquired for the event during the time period when the forensic service agreement specifies the second mode, and wherein the forensic data is acquired on a just-in-time basis when the forensic service agreement specifies the third mode, and generating one or more client inventory records for each client asset based on the forensic data related to each client asset;

searching the generated client inventory records for suspicious activity related to each client asset associated with the client;

generating one or more client evidence records for each client asset including forensic data related to suspicious activity associated with each client asset based on each client inventory record generated for each client asset; and persisting in a data store the one or more client inventory records and the one or more client evidence records including forensic data related to suspicious activity associated with each client asset;

wherein the forensic service agreement includes a subscription for Forensics as a Service (FaaS), and under the FaaS subscription, the cloud service provider is configured to expose one or more forensic functionalities related to one or more of on-demand investigation, troubleshooting, auditing, and logging of forensic data related to the client assets associated with the client.

* * * * *